July 4, 1950
R. L. HUNDSTAD
2,513,325
COMBUSTION APPARATUS
Filed Aug. 29, 1946
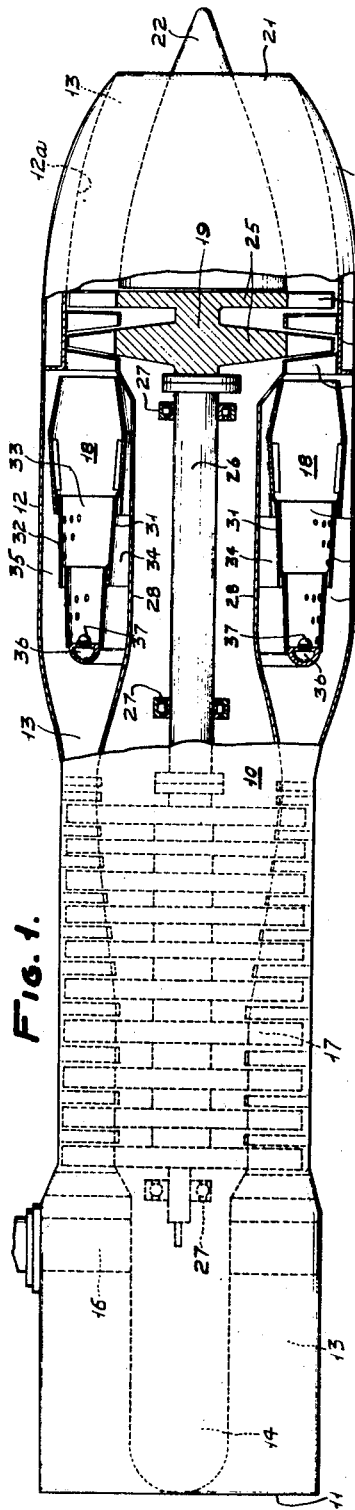
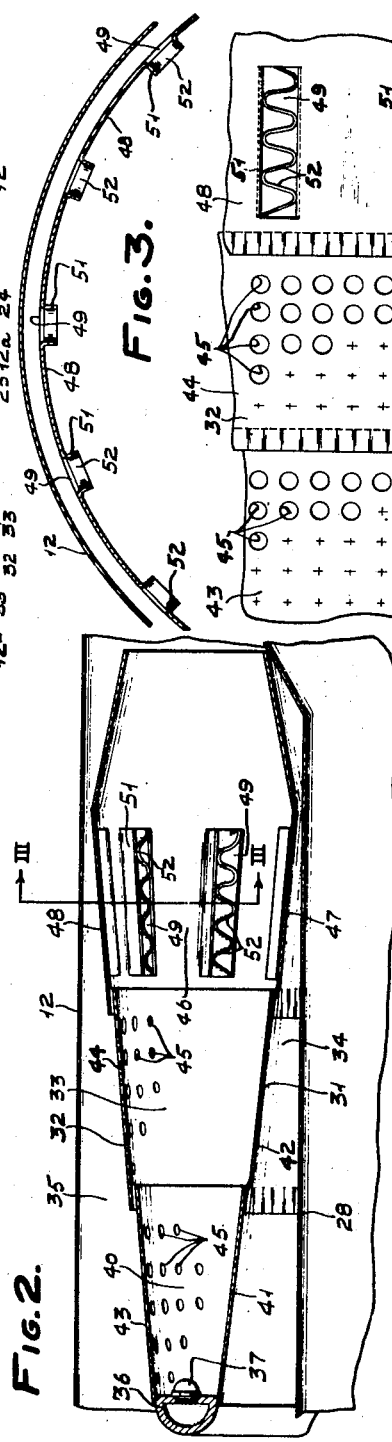
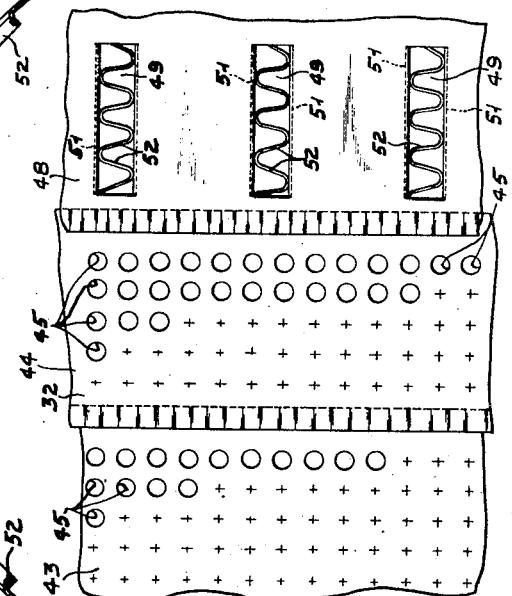
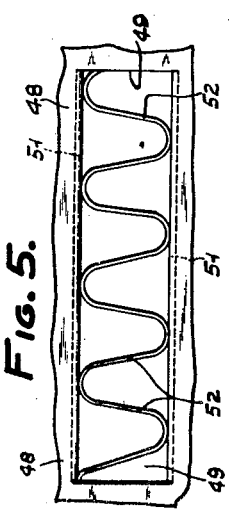
INVENTOR
RICHARD L. HUNDSTAD.
BY
ATTORNEY Patented July 4, 1950

2,513,325

UNITED STATES PATENT OFFICE 2,513,325

COMBUSTION APPARATUS

Richard L. Hundstad, Pittsburgh, Pa., assignor to Westinghouse Electric Corporation, East Pittsburgh, Pa., a corporation of Pennsylvania Application August 29, 1946, Serial No. 693,749

8 Claims. (Cl. 60—44)

1

This invention relates to combustion apparatus, more particularly to combustion chamber structure, and has for an object to provide improved apparatus of this character.

Another object of the invention is to provide, in a combustion chamber, novel means for obtaining positive and thorough mixing of secondary air with the hot products of combustion.

Yet another object of the invention is to provide a novel arrangement of openings in combustion chamber wall structure for admission of air to the chamber, together with means for strengthening the wall structure in the region of the openings.

These and other objects are effected by the invention as will be apparent from the following description and claims taken in connection with the accompanying drawing, forming a part of this application, in which:

Fig. 1 is a side elevational view of a gas turbine power plant incorporating the present invention, a portion of the outer casing and part of the inner structure being broken away to better illustrate the novel features;

Fig. 2 is an enlarged fragmentary view of a portion of the structure shown in Fig. 1, and comprising a longitudinal sectional view of part of the combustion apparatus;

Fig. 3 is a sectional view, taken along the line III—III of Fig. 2, looking in the direction indicated by the arrows;

Fig. 4 is a fragmentary plan view of one of the walls of the combustion chamber, shown in Fig. 2; and, Fig. 5 is an enlarged fragmentary plan view of a portion of the wall structure illustrated in Fig. 4.

The present invention, although not limited thereto, is particularly adapted for use with a gas turbine power plant of the type employed on aircraft to drive the propeller or an electric generator or to supply motive fluid for jet propulsion of the aircraft. Such a plant preferably comprises a streamlined tubular casing having mounted axially therein a compressor adjacent the forward or inlet end, a turbine adjacent the rearward or discharge end, and combustion apparatus located between the compressor and the turbine for heating the compressed air and which discharges the hot gases at suitable temperature and pressure to the turbine. The gases on leaving the turbine are discharged through a nozzle provided at the rear of the casing and may aid in propelling the aircraft.

Referring now to the drawing more in detail, the power plant shown in Fig. 1, and indicated

2 in its entirety by the reference character 10, is adapted to be mounted in or on the fuselage or wing of an aircraft with the left end or intake 11, as viewed in this figure, pointed in the direction of flight.

The plant comprises an outer shell or casing structure 12—12a providing an annular air duct or passage 13 extending fore and aft with respect to the aircraft. This casing has mounted therein, along its longitudinal axis, a fairing cone 14 adapted to house gearing connecting through a hollow guide vane 16 with auxiliaries (not shown), an axial-flow compressor 17, combustion apparatus generally indicated 18, a turbine 19 which drives the compressor, and a nozzle 21 defined by the casing 12a and by a tailpiece 22, the latter being mounted concentrically in the casing and cooperating with the latter to provide the propulsion nozzle.

Air enters at the intake 11 and flows substantially straight through the plant, passing through the compressor 17, where its pressure is raised, and into the combustion apparatus 18, where it is heated. The hot gases, comprising the products of combustion and excess air heated by the combustion, on leaving the combustion apparatus are directed by suitable guide vanes or nozzles 23 against the blades 24 of the turbine discs 25 and then are discharged through the propulsion nozzle 21 to propel the aircraft.

By reference to Fig. 1 it will be seen that the compressor and turbine rotors are interconnected by means of a shaft 26 supported by suitable bearings 27 and enclosed by an inner wall structure, generally indicated 28, which protects the shaft and bearings from high temperatures and also defines a portion of the annular air flow passage 13 in which the combustion apparatus 18 is disposed.

The present invention is not limited to the specific details or arrangements of structure thus far described, but is primarily concerned with the combustion apparatus, indicated generally at 18.

A pair of frusto-conical inner and outer annular walls 31 and 32, respectively, separate the annular flow passage 13, at the region of the combustion apparatus 18, into an annular burner or combustion space 33 overlapped both inwardly and outwardly by annular air spaces 34 and 35, respectively. The inner wall 31 is disposed with its base or larger end upstream and the outer wall 32 has its base or larger end downstream, with the result that the burner space 33 defined thereby increases in cross-sectional area from its upstream end to its downstream end. Conversely, the inner and outer overlapping air spaces 34 and 35, the former defined by the walls 28 and 31 and the latter by the walls 12 and 32, decrease in cross-sectional area from their upstream ends to their downstream ends.

Preferably, the upstream end of the burner space 33 is closed by an annular wall 36, in which is mounted an annular series of fuel nozzles 37, adapted to direct the fuel discharging therefrom downstream in directions substantially parallel to the longitudinal axis of the power plant.

In the construction herein illustrated, the burner space 33 is comprised by an upstream igniting and burning portion 40 defined by annular wall sections 41, 42, 43 and 44, perforated at 45 for admission of primary air, and a downstream mixing and cooling portion 46 defined by the annular walls 47 and 48 and provided with elongated openings 49 for admission of secondary air to the mixing and cooling portion.

Preferably, the openings 49 are formed with radial flanges 51 at their longitudinal edges, which serve not only to strengthen the wall structure but to guide the entering secondary air towards the center of the flow path of hot products of combustion from the upstream igniting and burner portion.

To positively insure flow of entering secondary air in directions substantially transverse to the flow of hot products of combustion, additional baffle means in the form of convoluted or corrugated strips 52 are disposed in the openings 49 between the side flanges 51 and are preferably secured to the latter by suitable means, for example, welding.

These corrugated strips 52 serve both to resiliently strengthen the wall 48 and to direct the entering secondary air so that maximum mixing thereof with the hot products of combustion is obtained.

While I have shown the invention in but one form, it will be obvious to those skilled in the art that it is not so limited, but is susceptible of various changes and modifications without departing from the spirit thereof.

What is claimed is:

1. In combustion apparatus, wall structure defining a combustion chamber and having a series of openings therethrough elongated in the direction of flow of gases through the combustion chamber; and a plurality of baffles associated with each of said elongated openings and disposed in planes generally transverse to said direction of flow of gases, whereby air entering said combustion chamber through said elongated openings flows transversely of the gas stream within the combustion chamber to thoroughly mix therewith.

2. In combustion apparatus, wall structure defining a combustion chamber and an overlapping air space, said wall structure including an annular wall separating said chamber from said air space, said annular wall having a plurality of elongated openings therein for admission of air to said chamber, flanges extending inwardly from the sides of said openings, and baffles extending laterally of said openings between said flanges and supported by the latter.

3. In combustion apparatus, wall structure defining a combustion chamber, said wall structure including an annular wall having a plurality of elongated openings therethrough for admission of air to said combustion chamber, flanges carried by said annular wall adjacent the longitudinal edges of the elongated openings and extending generally radially into said chamber, and a plurality of baffles associated with the flanges of each of said openings, said baffles lying in planes approximately normal to said flanges and to said annular wall.

4. In combustion apparatus, wall structure defining a combustion chamber, said wall structure including a wall having a plurality of elongated openings therein, flanges at the long sides of said openings and extending perpendicularly to said wall, and baffles extending between the flanges of each opening in bridging relation to said openings, said baffles being disposed generally perpendicularly to the wall and to the longitudinal axes of the openings.

5. Structure as specified in claim 4, wherein the baffles of each opening are formed by a convoluted strip, with the ends of the convolutions engaging the side flanges.

6. In combustion apparatus, wall structure defining a combustion chamber, said wall structure including a wall having a plurality of elongated openings therein, opposed flanges at the long sides of said openings and extending generally perpendicularly to said wall, and a convoluted baffle strip extending longitudinally of each of said openings between the opposed side flanges with the convolutions disposed generally transversely of the longitudinal axes of the openings.

7. In combustion apparatus, wall structure defining a combustion chamber and having a plurality of openings therethrough elongated in the general direction of flow of gases through the combustion chamber, and one or more baffles associated with each of said openings and disposed in planes generally transverse to said direction of flow of gases, whereby air entering said combustion chamber through said elongated openings flows transversely of the gas stream within the combustion chamber to thoroughly mix therewith.

8. In combustion apparatus, wall structure defining a combustion chamber and having a plurality of openings therein for admission of air to said chamber, flanges extending inwardly from the sides of said openings, and one or more baffles extending laterally of said openings between said flanges, whereby air entering said combustion chamber through said openings flows transversely of the gas stream within the combustion chamber to thoroughly mix therewith.

RICHARD L. HUNDSTAD.

REFERENCES CITED

The following references are of record in the file of this patent:

UNITED STATES PATENTS

| Number | Name | Date |
|---|---|---|
| 1,435,939 | Pomery | Nov. 21, 1922 |
| 1,778,839 | Thurn | Oct. 21, 1930 |
| 2,251,711 | Livar | Aug. 5, 1941 |
| 2,398,654 | Lubbock et al. | Apr. 16, 1946 |